United States Patent
Jannerfeldt et al.

(10) Patent No.: US 10,087,290 B2
(45) Date of Patent: Oct. 2, 2018

(54) PARTICLES COMPRISING POLYTETRAFLUOROETHYLENE AND PERFLUOROPOLYETHER

(71) Applicant: THE CHEMOURS COMPANY FC, LLC, Wilmington, DE (US)

(72) Inventors: Claes Gustav Jannerfeldt, Arzier (CH); Martial Jean-Jacques Pabon, Prevessin (FR); Jo Ann Nelissen, Mechelen (BE)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 20 days.

(21) Appl. No.: 15/315,736

(22) PCT Filed: Jun. 9, 2015

(86) PCT No.: PCT/US2015/034838
§ 371 (c)(1),
(2) Date: Dec. 2, 2016

(87) PCT Pub. No.: WO2015/195406
PCT Pub. Date: Dec. 23, 2015

(65) Prior Publication Data
US 2017/0114190 A1    Apr. 27, 2017

Related U.S. Application Data

(60) Provisional application No. 62/013,155, filed on Jun. 17, 2014.

(51) Int. Cl.
*C08L 27/18* (2006.01)
*C08J 3/12* (2006.01)
*C09D 7/65* (2018.01)

(52) U.S. Cl.
CPC ............... *C08J 3/124* (2013.01); *C08L 27/18* (2013.01); *C09D 7/65* (2018.01); *C08J 2327/18* (2013.01); *C08J 2471/00* (2013.01)

(58) Field of Classification Search
CPC .... C08J 3/124; C08J 2327/18; C08J 2471/00; C08L 27/18; C08L 27/12; C09D 7/125; C09D 7/16; C08K 5/02
See application file for complete search history.

(56) References Cited

U.S. PATENT DOCUMENTS

| | | |
|---|---|---|
| 3,142,665 A | 7/1964 | Cardinal et al. |
| 3,819,594 A | 6/1974 | Holmes et al. |
| 6,870,020 B2 | 3/2005 | Aten et al. |

FOREIGN PATENT DOCUMENTS

| | | |
|---|---|---|
| EP | 0615779 A1 | 3/1993 |
| EP | 0754738 A1 | 1/1997 |
| EP | 0856570 A2 | 5/1998 |
| EP | 0930328 A1 | 7/1998 |

OTHER PUBLICATIONS

International Search Report and Written Opinion, PCT/15/34838, dated Sep. 21, 2015.

*Primary Examiner* — Nathan M Nutter

(57) ABSTRACT

Novel PTFE/PFPE particles and method for making the same are disclosed. The PFPE is absorbed into the PTFE particles. The PTFE/PFPE particles find utility as additives to be combined with other polymers.

8 Claims, No Drawings

PARTICLES COMPRISING POLYTETRAFLUOROETHYLENE AND PERFLUOROPOLYETHER

FIELD OF THE INVENTION

The invention relates to fluoropolymer particles. Certain fluoropolymer particles can be used as additives in small amounts to improve properties of other polymers.

BACKGROUND OF THE INVENTION

It is known to add perfluoropolyether ("PFPE") polymer as an additive to certain polymers (e.g., thermoplastic polymers) to provide improved properties, such as to reduce the friction coefficient and wear rate of the polymer. However, due to the relatively high cost of PFPE, it is economically feasible to add only small amounts of PFPE to the polymer. For example, it may be possible to add only about 0.1 weight percent of PFPE (based on the total weight of the PFPE and the polymer) to the polymer in order to produce an economically attractive product.

Further problems arise when using such small amounts of PFPE since it is difficult to homogeneously dose and disperse the PFPE in standard processing equipment, such as melt compounding equipment.

Polytetrafluoroethylene ("PTFE") powder is a commonly used additive to improve friction coefficient and wear rate of certain molded or extruded polymer parts. A problem with using PTFE powder is that relatively high concentrations (above 5 weight percent) generally are needed to obtain significant, desired effects. Moreover, the addition of PTFE powder in high amounts will generally reduce certain mechanical properties of the modified polymer, such as impact and tensile strength.

It is also known to add small amounts of PTFE powder to PFPE oil in order to thicken the PFPE oil. Generally, such PTFE containing PFPE oils may contain from about 1 weight percent to about 40 weight percent PTFE powder.

BRIEF SUMMARY OF THE INVENTION

The invention relates to particles comprising PTFE and PFPE. In an aspect of the invention the PTFE comprises PTFE powder. In a further aspect of the invention the PTFE comprises micronized PTFE powder.

It has been surprisingly found that PFPE polymer and PTFE particles can be combined in certain weight ratios to provide an attractive polymer additive comprising PTFE and PFPE absorbed into the PTFE ("PTFE/PFPE particles"). Surprisingly it has been found that the PTFE/PFPE particles can be used as an economical polymer additive that provides homogeneous dosing and dispersion of the particles and improved properties.

Moreover, by combining PFPE polymer and PTFE particles according to the present invention, the PFPE is absorbed into the PTFE which modifies certain properties of the PTFE particles to provide improved dosing and dispersion of the particles when used as an additive.

The invention also relates to a method for making the PTFE/PFPE particles comprising the steps of: mixing together about 1 to 40 weight percent PFPE polymer and about 60 to 99 weight percent PTFE particles, based on the total combined weight of the PFPE polymer and the PTFE particles, to result in the PTFE/PFPE particles. The PTFE/PFPE particles comprise from about 1 to about 40 weight percent PFPE and from about 60 to about 99 weight percent PTFE. Although any PTFE particles can be used, in an aspect of the invention, the PTFE comprises a low molecular weight PTFE powder. In a further aspect of the invention the PTFE particles comprise micronized PTFE powder.

In a further aspect of the invention the PTFE powder can have an average particle size distribution of less than about 100 μm.

In a still further aspect of the invention, the PTFE particles have a specific surface area of from about 1 to about 25 m$^2$/g. In a further aspect of the invention the PTFE particles have an average particle size distribution of less than about 25 μm.

In an aspect of the invention, the PFPE polymer should have a sufficient thermal stability to withstand the high temperatures realized during compounding. Generally the compounding is done at temperatures of up to about 300° C., calling for PFPE polymers with a kinematic viscosity of above 100 cSt at 40° C. However, the viscosity can vary with the type of PFPE polymer used.

DETAILED DESCRIPTION OF THE INVENTION

The invention relates to particles comprising PTFE and PFPE. In an aspect of the invention the PTFE comprises PTFE powder. In a further aspect of the invention the PTFE comprises micronized PTFE powder.

The invention also relates to a method for making the PTFE/PFPE particles comprising the steps of: mixing together about 1 to 40 weight percent PFPE polymer and about 60 to 99 weight percent PTFE particles, based on the total combined weight of the PFPE polymer and the PTFE particles, to result in PTFE/PFPE particles. The PTFE/PFPE particles comprise from about 1 to about 40 weight percent PFPE and from about 60 to about 99 weight percent PTFE. In an aspect of the invention the PTFE/PFPE particles consist essentially of PTFE and PFPE. In a further aspect of the invention the PTFE/PFPE particles consist essentially of from about 1 to about 40 weight percent PFPE and from about 60 to about 99 weight percent PTFE. In an aspect of the invention the PTFE/PFPE particles consist of PTFE and PFPE. Although any PTFE particles can be used, in an aspect of the invention, the PTFE comprises a low molecular weight PTFE powder. In a further aspect of the invention the PTFE particles comprise micronized PTFE powder.

In an aspect of the invention, the PTFE comprises a low molecular weight PTFE with a number average molecular weight below about 1,000,000 g/mol.

In a further aspect of the invention the PTFE particles have an average particle size distribution of less than about 100 μm. In a still further aspect of the invention the PTFE particles have an average particle size distribution of less than about 25 μm and preferably from about 1 μm to about 20 μm.

In a still further aspect of the invention, the PTFE particles have a specific surface area of from about 1 to about 25 m$^2$/g.

In an aspect of the invention, the PFPE polymer should have a sufficient thermal stability to withstand the high temperatures realized during compounding. Generally the compounding is done at temperatures of up to about 300° C., calling for PFPE polymers with a kinematic viscosity of above 100 cSt at 40° C.

Suitable PFPE polymer (as used herein "polymer" includes, for example, fluid, grease, liquid, and oil) is commercially available from a number of suppliers. A common characteristic of perfluoropolyethers is the presence of perfluoroalkyl ether moieties. Perfluoropolyether is synonymous to perfluoroalkylether. Other synonymous terms frequently used include "PFPE", "PFPE oil", "PFAE" and "PFPAE".

For example, KRYTOX® available from The Chemours Company is a perfluoropolyether having the formula of $CF_3-(CF_2)_2-O-[CF(CF_3)-CF_2-O]_{j'}-R'_f$. In the formula, j' is 2-100, inclusive and $R'_f$ is $CF_2CF_3$, a $C_3$ to $C_6$ perfluoroalkyl group, or combinations thereof. A further perfluoropolyether example, Fluoroguard® polymer additive, is also available from the The Chemours Company.

FOMBLIN® and GALDEN® fluids, available from Solvay Specialty Polymers and produced by perfluoroolefin photooxidation, can also be used. FOMBLIN-Y® can have the formula of $CF_3O(CF_2CF(CF_3)-O-)_m(CF_2-O-)_n-R^1_f$. Also suitable is $CF_3O[CF_2CF(CF_3)O]_{m'}(CF_2CF_2O)_{o'}(CF_2O)_{n'}-R^1_f$. In the formulae $R^1_f$ is $CF_3$, $C_2F_5$, $C_3F_7$, or combinations of two or more thereof; (m'+n') is 8-45, inclusive; and m/n is 20-1000, inclusive; o' is >1; (m'+n'+o') is 8-45, inclusive; m'/n' is 20-1000, inclusive.

FOMBLIN-Z® can have the formula of $CF_3O(CF_2CF_2-O-)_{p'}(CF_2-O)_{q'}CF_3$ where (p'+q') is 40-180 and p'/q' is 0.5-2, inclusive.

DEMNUM® fluids, available from Daikin Industries, Japan, can also be used. It can be produced by sequential oligomerization and fluorination of 2,2,3,3-tetrafluorooxetane, yielding the formula of $F-[(CF_2)_3-O]_{t'}-R^2_f$ where $R^2_f$ is $CF_3$, $C_2F_5$, or combinations thereof and t' is 2-200, inclusive.

Suitable PTFE particles can be the granular type or the fine powder type. The PTFE particles can be homopolymer of tetrafluoroethylene or a copolymer thereof with a small amount of comonomer. PTFE containing small amounts of comonomer are known in the art as "modified PTFE" or "trace modified PTFE" and as used herein "PTFE" includes PTFE homopolymer and PTFE containing comonomer. As used herein "PTFE particles" include PTFE granules, PTFE powders, and micronized PTFE powders. Examples of comonomers include, but are not limited to, chlorotrifluoroethylene, perfluorobutylethylene, hexafluoropropylene and/or perfluoro(alkyl vinyl ether). Examples of modified PTFE are disclosed in U.S. Pat. Nos. 3,142,665; 3,819,594; and 6,870,020.

Non-melt flowable PTFE is to be distinguished from low molecular weight PTFE, which because of its low molecular weight has melt flowability but not melt-fabricability. This melt flowable PTFE, which has an melt flow rate that is measurable by ASTM D 1238-94a, can be obtained by direct polymerization under conditions that prevent very long polymer chains from forming, or by irradiation degradation of non-melt flowable PTFE. Such melt flowable, low molecular weight PTFE is commonly called micronized PTFE powder, which are usually agglomerates or grains used as additives to, for example, thermoplastics. In an aspect of the invention the PTFE particles comprise such micronized PTFE powder.

It has been surprisingly found that an attractive, economical additive comprising PTFE/PFPE particles can be obtained by careful selection of the PTFE particle used. Preferably, the PTFE comprises micronized PTFE powder, which is based on emulsion polymerized PTFE. Such micronized PTFE powders are characterized by having a larger specific surface area, as compared to PTFE particles based on suspension polymerized PTFE. Low molecular weight, micronized PTFE powders as specified by ASTM D5675-04, are the most suitable. Such micronized PTFE powders generally have a melt flow rate of greater than 0.1 g/10 min. and are in the form of dry, free-flowing powder having an average bulk product particle size in the range of 1 to 20 μm and specific surface areas ranging from about 1 to about 25 $m^2/g$.

Suitable micronized PTFE powder is commercially available from a number of suppliers. For example, micronized PTFE powder suppliers include The Chemours Company (Zonyl® Fluoroadditive powders), Solvay (Algoflon® L and Polymist® PTFE micronized powders), 3M (Dyneon® PTFE micropowder), Asahi Glass Company (Fluon® PTFE Lubricants) and Daikin (Lubron™ PTFE micropowder).

In an aspect of the invention, Zonyl® Fluoroadditives MP1000, MP1100, MP1200, MP1300, MP1400, MP1400F, and MP1600 can be used. These PTFE powders have specific surface areas ranging from 1.5 $m^2/g$ to 12 $m^2/g$. In a further aspect of the invention, Algoflon® L and Polymist® PTFE micronized powders L100, L101, L203, L206, XPP511, F5A, F5AEX, and F284 can be used. These PTFE powders have specific surface areas ranging from 3.0 $m^2/g$ to >20 $m^2/g$. In a still further aspect, Dyneon® PTFE micropowders TF9201Z, TF9205, and TF9207Z can be used. These PTFE powders have specific surface areas ranging from 2 $m^2/g$ to 17 $m^2/g$. In yet another aspect, Fluon® PTFE Lubricants L150J, L169J, L1705J, L1725J, and L173J can be used. These PTFE powders have specific surface areas ranging from 1.3 $m^2/g$ to 8.2 $m^2/g$. In a further aspect, Lubron™ PTFE micropowders L-2, L-5, and L-5F can be used. These PTFE powders have specific surface areas ranging from 8 $m^2/g$ to 11 $m^2/g$.

It has been surprisingly found that by combining PFPE polymer and micronized PTFE powder according to the present invention, the PFPE is absorbed into the PTFE and the combined materials result in PTFE/PFPE powders having improved powder flow properties when compared to micronized PTFE powders without PFPE. Surprisingly it has been found that the PTFE/PFPE particles can be used as an economical polymer additive that provides homogeneous dosing and dispersion of the particles and improved properties.

The powder flow properties have been found to be even more improved with emulsion polymerized PTFE powder versus suspension polymerized PTFE powder. It is believed that emulsion polymerized PTFE absorbs more PFPE and that this results in less powder to powder sticking, which results in improved powder flow. The PTFE/PFPE powder results in improved powder feeding during, for example, extrusion processes and improved dosing and homogeneity of the final product when using the micronized PTFE powders as an additive.

It has been found that particularly attractive properties can be obtained by combining the PFPE polymer and micronized PTFE powders in amounts ranging from about 1 weight percent to 40 weight percent PFPE and about 60 weight percent to about 99 weight percent micronized PTFE powder. More preferably between 10 to 30 weight percent of PFPE polymer and 70 to 90 weight percent micronized PTFE powder.

The PFPE polymer and PTFE particles can be combined, for example, by dissolving the PFPE in a suitable solvent and blending the PTFE particles with the dissolved PFPE. The blending can be conducted at ambient conditions, as those of ordinary skill will understand. After blending the PTFE particles with the dissolved PFPE, the blend can be placed in an oven to evaporate the solvent, thus producing the PTFE/PFPE particles. In an alternative embodiment the PFPE polymer and PTFE particles can be combined by heating the PFPE to a temperature sufficient to reduce its viscosity and facilitate its absorbtion into the PTFE particle. In an aspect of the invention, substantially all of the PFPE is absorbed into the PTFE particles.

In an aspect of the invention, the PTFE/PFPE particles can be combined in small amounts with other polymers to modify the properties of such other polymers. Preferably, the PTFE particles comprise micronized PTFE powder. For example, polymers can be modified by adding from about 0.1 to about 20 weight percent of the PTFE/PFPE particles (based on the total weight of the polymer and the PTFE/PFPE particles) to other polymers (such as polymers that are to be extruded, molded, used as coatings, etc.) to improve properties such as friction, wear, stain and scratch resistance, as well as improved processability such as reduced torque and improved mold release. The PTFE/PFPE particles can be extruded or molded with polymers to form compounds comprising the polymer and PTFE/PFPE particles. Moreover, the PTFE/PFPE particles can be combined with polymers to form coating compositions comprising the PTFE/PFPE particles and polymer. Examples of polymers that will benefit from the addition of the PTFE/PFPE particles of the invention include, for example, thermoplastic polymers used in melt extrusion and injection molding processes such as polyamide, polyoxymethylene, polyethylene terephthalate, polybutylene terephthalate, polyphenylene sulfide, polycarbonate, polyetherketone, polyether sulfone, polysulfone, thermoplastic urethane, thermoplastic elastomer, polyethylene, polypropylene, and acrylonitrile/butidien/styrene.

Analytical Methods

In the following Examples, average particle size distribution is determined by Laser diffraction method using a Microtrac analyzer. Specifically, the PTFE particle size was measured using the Microtrac light scattering method. In this method the laser Microtrac full range analyzer, model S3500, measures particle sizes from 0.02-1408 microns. The analyzer utilizes the phenomenon of low angle, forward scattered light from a diode laser projected through a stream of particles. The amount and direction of light scattered by the particles is then analyzed by a microcomputer, which calculates the size distributions of the particles in the mixture. The analyzer consists of a computer control module, an optics module and a sample recirculator.

Specific surface area is determined by nitrogen adsorption. Specifically, the Specific Surface Area (SSA) was measured on a Flowsorb 2300 instrument from Micromeritics Corp (Norcross, Ga.). The principle of the test is to measure the quantity of nitrogen gas adsorbed on the surface of the sample. The surface area is assumed to be directly proportional to the quantity of nitrogen adsorbed. The sample is weighed, dried at 120-200 deg C. for at least 30 minutes in an air oven and then placed in a sample holder. The sample is outgassed at 200° C. prior to the measurement. The equipment gives a surface area of the sample and the SSA is then calculated by dividing the measured surface area by the sample weight.

Powder or particle flowability is determined by measuring the time it takes to pass 20 grams of powder or particles through a plastic funnel with an exit diameter of 9 mm and a tube length of 50 mm.

EXAMPLES

Example 1

A sample of about 70 grams of Fluoroguard® PCA perfluoropolyether (available from The Chemours Com-
pany, Wilmington, Del.) was dissolved in about 280 grams of Vertrel® XF specialty fluid (The Chemours Company, Wilmington, Del.) in a glass container and stirred with a magnetic stirrer for about 30 minutes at room temperature.

Three samples (1a, 1b, and 1c) were prepared by mixing together Zonyl® MP1600 Fluoroadditive (micronized PTFE powder, having an average particle size distribution of about 7 μm and a specific surface area of from about 8 to 12 $m^2/g$, available from The Chemours Company, Wilmington, Del.) with the dissolved perfluoropolyether at PTFE/PFPE weight ratios of about 90:10 (sample 1a), about 80:20 (sample 1b), and about 70:30 (sample 1c). The three samples were stirred for about 15 minutes by hand using a metallic spatula and then placed in an Salvis convection oven set at 50° C. for about 12 hours in order to evaporate the Vertrel® XF solvent. The samples were periodically stirred throughout the evaporation process.

Once the Vertrel® XF solvent had evaporated, the resulting PTFE/PFPE powder samples were removed from the oven and the powder flowability of each sample was determined using a funnel test to measure the time it took a 20 gram sample of powder to pass through a plastic funnel having an opening diameter of 9 mm and a tube length of 50 mm.

The powder flowability of a 20 gram sample of untreated Zonyl® MP1600 Fluoroadditive (comparative sample 1d) was also determined by the same funnel test.

Samples 1a, 1b, and 1c all took about 1 second to pass through the funnel without the need to shake or otherwise agitate the contents as it passed through the funnel. Comparative sample 1d took about 25 seconds to pass through the funnel, while the funnel was constantly, gently shaken by hand in order to pass the sample through the funnel.

Example 2

A sample of about 70 grams Fluoroguard® PCA perfluoropolyether (available from The Chemours Company, Wilmington, Del.) was dissolved in about 280 grams of Vertrel® XF specialty fluid (The Chemours Company, Wilmington, Del.) in a glass container and stirred with a magnetic stirrer for about 30 minutes at room temperature.

Three samples (2a, 2b, and 2c) were prepared by mixing together Zonyl® MP1400 Fluoroadditive (micronized PTFE powder, having an average particle size distribution of about 10 μm and a specific surface area of from about 1.5 to 3 $m^2/g$, available from The Chemours Company, Wilmington, Del.) with the dissolved perfluoropolyether at PTFE/PFPE weight ratios of about 90:10 (sample 2a), 80:20 (sample 2b), and 70:30 (sample 2c). The three samples were stirred for about 15 minutes by hand using a metallic spatula and then placed in an Salvis convection oven set at about 50° C. for about 12 hours in order to evaporate the solvent. The samples were periodically stirred throughout the evaporation process.

Once the Vertrel® XF solvent had evaporated, the resulting PTFE/PFPE powder samples were removed from the oven and the powder flowability was determined using a funnel test to measure the time it took an about 20 gram sample of powder to pass through a plastic funnel having an opening diameter of 9 mm and a tube length of 50 mm.

The powder flowability of a 20 gram sample of untreated Zonyl® MP1400 Fluoroadditive (comparative sample 2d) was also determined by the same funnel test.

Sample 2a took about 14 seconds to pass through the funnel while gently shaking the funnel by hand. Samples 2b and 2c took about 11 and 9 seconds, respectively, to pass through the funnel while gently shaking the funnel by hand. Comparative sample 2d took about 20 seconds to pass through the funnel while gently shaking the funnel by hand.

Example 3

This example demonstrates the use of PTFE/PFPE powder as an additive in thermoplastic polymers.
Preparation of PTFE/PFPE Additive (Samples 1 and 2):

A sample of about 100 grams of PFPE (Fluoroguard® PCA available from The Chemours Company, Wilmington, Del.) was dissolved in about 400 grams of Vertrel® XF specialty fluid (The Chemours Company, Wilmington, Del.) in a glass container and stirred with a magnetic stirrer for about 30 minutes. Zonyl® MP1600 Fluoroadditive (PTFE micropowder, having an average particle size distribution of about 7 μm and a specific surface area of from about 8 to 12 $m^2/g$, (available from The Chemours Company, Wilmington, Del.) was mixed with the dissolved perfluoropolyether at PTFE/PFPE weight ratios of about 80:20. The sample was stirred for about 15 minutes by hand using a metallic spatula and then placed in an Salvis convection oven set at 50° C. for about 12 hours in order to evaporate the Vertrel® XF solvent. The samples were periodically stirred throughout the evaporation process. Once the Vertrel® XF solvent had evaporated, the PTFE/PFPE powder samples were removed from the oven.

Blends of Delrin® 511 polyoxymethaline ("POM"), available from E. I. Du Pont de Nemours and Company, Wilmington, Del.) and the PTFE/PFPE powder were produced in a 40 mm twin screw extruder from Beiersdorf. Typical POM extrusion conditions were used. The extruded material was further injection molded in a Netstal injection molding machine in order to produce rectangular bars with approximate dimensions of 100×100×3 mm. Typical injection molding conditions for POM were used.

Reference samples of pure POM (comparative sample 1), POM modified with Zonyl® MP1600 (comparative samples 2-5), POM modified with Fluoroguard® PCA (comparative sample 6) and POM modified with Fluoroguard® PCA+ Zonyl® MP1600 (comparative samples 7 and 8) were produced in the same manner as outlined above.

A reference sample of pure POM that had been surface coated with 50 mg of PFPE on the surface of 100×100 mm was prepared as well (comparative sample 9).

The water contact angle was measured for all blends using a goniometer (Model 100-00 230 from Rame-Hart, Inc.). The average of 10 measurements are reported for each blend.

TABLE 1

| Sample # | Additive type and concentration | Contact Angle | Standard deviation |
| --- | --- | --- | --- |
| Sample 1 | 1.5 wt % PFPE impregnated PTFE | 73.2 | 1.44 |
| Sample 2 | 3.5 wt % PFPE impregnated PTFE | 75.7 | 0.99 |

TABLE 1-continued

| Sample # | Additive type and concentration | Contact Angle | Standard deviation |
| --- | --- | --- | --- |
| Comparative 1 | None | 64.2 | 1.26 |
| Comparative 2 | 1.5 wt % PTFE | 65.7 | 1.43 |
| Comparative 3 | 3.5 wt % PTFE | 63.8 | 1.70 |
| Comparative 4 | 10 wt % PTFE | 66.8 | 5.56 |
| Comparative 5 | 20 wt % PTFE | 68.3 | 1.85 |
| Comparative 6 | 1.5 wt % PFPE | 75.3 | 1.22 |
| Comparative 7 | 0.3 wt % PFPE + 1.2 wt % PTFE | 76.5 | 2.69 |
| Comparative 8 | 0.7 wt % PFPE + 2.8 wt % PTFE | 74.6 | 1.85 |
| Comparative 9 | POM with topologically applied PFPE | 74.8 | 1.89 |

The results show that the addition of PFPE significantly increases the contact angle of POM. Since highly fluorinated materials such as PTFE and PFPE have a very high contact angle with water, this indicates that the PFPE has a high tendency to locate at the POM surface. PTFE on the other hand does not affect significantly the contact angle, indicating that the PTFE has a tendency to locate in the bulk of the POM. The PFPE impregnated PTFE according to the present invention has a similar contact angle as the samples containing pure PFPE or samples which contains PTFE and PFPE which has been separately fed (no pre-impregnation of the PFPE in the PTFE). Hence, these results show that the pre-impregnation process does not negatively affect the efficiency of the PFPE and its tendency to locate at the surface. When modifying polymers to improve surface properties such as wear, friction, anti-stick, anti-stain etc., it is desired that the modifying additive is concentrated at the surface (rather than to be stuck in the bulk). The higher contact angle with PFPE would typically lead to improved anti-stick and anti-stain properties. PFPE being a lubricant, it would also reduce friction and wear of the polymer surface.

Example 4

This example further demonstrates the effect of PTFE:PFPE ratio on powder flow.

30 gram test samples of PTFE/PFPE powder were prepared essentially as described in Examples 1 and 2. Powder flow for each sample was tested 3 times and the average for each sample was calculated.

A PFPE/Vetrel® XF preblend was prepared by mixing 70 grams of Fluoroguard® PCA with 280 grams of Vetrel® XF in a glass beaker using a magnetic stirrer. The PFPE/Vetrel® XF preblend was mixed with Zonyl® MP1600 (Table 2) and Zonyl® MP1400 (Table 3) using essentially the same procedure as described in Examples 1 and 2.

Samples were poured into a plastic funnel with a 9 mm exit and 50 mm tube mounted on a Sieve Shaker (Edecotts, Octagon 200) set at a vibration level of 4. Thirty grams of sample were poured slowly into the funnel and the time required for the sample to pass through the funnel was measured in seconds and recorded.

TABLE 2

| Sample | PTFE (%) | PFPE (%) | Weight PTFE (g) | Weight PFPE (g) | Weight PFPE/Vertrel ®XF (g) | $1^{st}$ test | $2^{nd}$ test | $3^{rd}$ test | Average 1-3 |
| --- | --- | --- | --- | --- | --- | --- | --- | --- | --- |
| Comparative Sample | 100 | | 50 | | | 25 | 27 | 27 | 26 |

TABLE 2-continued

| Sample | PTFE (%) | PFPE (%) | Weight PTFE (g) | Weight PFPE (g) | Weight PFPE/Vertrel ®XF (g) | 1st test | 2nd test | 3rd test | Average 1-3 |
|---|---|---|---|---|---|---|---|---|---|
| Sample 1 | 90 | 10 | 45 | 5 | 25 | 14 | 15 | 14 | 14 |
| Sample 2 | 80 | 20 | 40 | 10 | 50 | 3 | 3 | 3 | 3 |
| Sample 3 | 70 | 30 | 35 | 15 | 75 | 2 | 1.5 | 2 | 2 |

TABLE 3

| Sample | PTFE (%) | PFPE (%) | Weight PTFE (g) | Weight PFPE (g) | Weight PFPE/Vertrel ® XF (g) | 1st test | 2nd test | 3rd test | Average 1-3 |
|---|---|---|---|---|---|---|---|---|---|
| Comparative Sample | 100 | | 50 | | | 11 | 10 | 12 | 11 |
| Sample 1 | 90 | 10 | 45 | 5 | 25 | 9 | 4 | 4 | 6 |
| Sample 2 | 80 | 20 | 40 | 10 | 50 | plugged | 7 | plugged | NA |
| Sample 3 | 70 | 30 | 35 | 15 | 75 | 8 | plugged | plugged | NA |

From the results above it can be seen that for the Zonyl®MP1600 powder with absorbed PFPE improves the powder flow at all addition levels. For the Zonyl® MP1400 powder, low levels (10 wt %) of absorbed PFPE improves the powder flow, while at high levels (20 and 30 wt %) the powder flow is reduced to the point that it completely plugged the funnel.

Example 5

This example demonstrates the use of PTFE/PFPE particles as an additive in coating formulations.
The following materials were used to prepare the coating formulations:
1.) Zonyl® MP1000 PTFE Fluoroadditive (micronized PTFE powder, having an average particle size distribution of about 12 µm and a specific surface area of from about 5 to 10 m2/g, available from The Chemours Company, Wilmington, Del.).
2.) Perfluoropolyether, Krytox® GPL106 (The Chemours Company).
3.) High temperature resistant binders.
4.) Solvent.
Preparation of PTFE/PFPE Particles:
Essentially the same procedure was used as in Examples 1 and 2 to prepare the PTFE/PFPE particles except that Zonyl® MP1000 PTFE Fluoroadditive (micronized PTFE powder, having an average particle size distribution of about 12 µm and a specific surface area of from about 5 to 10 m2/g, available from The Chemours Company, Wilmington, Del.) was used as the PTFE instead of Zonyl® MP1600 and Zonyl® MP 1400 PTFE micronized powder and Krytox® GPL was used as the PFPE. The PFPE:PTFE weight ratio of the samples was 1:4.
Coating Formulations were Prepared as Follows:
The PTFE/PFPE particles, PFPE, binder, and solvent were mixed together using a laboratory 'desk-top' horizontal enclosed bead mill ('MINI'MOTORMILL produced by Eiger Torrance Ltd) at a mixing speed of 2500-3500 rpm for 10-30 minutes to form coating compositions. The coating compositions, which all contained the same quantity of PTFE, are listed in Table 4.
The coatings were applied to aluminium panels as follows:
The coatings were sprayed on aluminium panels using a conventional HVLP spray gun. The coatings were subsequently baked using standard baking conditions in the range of 180° C. up to 350° C.

Comparative Sample 1 resulted in a defect free and homogenous coating. Sample 1 resulted in a defect free coating even though the wetting was not as good as that of the Comparative Sample 1. Comparative Sample 2, which contained the same amount of PTFE and PFPE as Sample 1, produced an inhomogeneous coating with a significant amount of blisters.
Testing of Non-Stick Performance:
A small amount of polyurethane isolation foam (Souda-Foam Comfort Genius, Soudal) was sprayed on the coated panels. The foam was left to harden and the adhesion of the foam to the metal panel was tested by removing it from the panel by hand. Coatings with good non-stick performance result in no foam remaining on the panel after hand removal. For coatings having poor non-stick performance, some polyurethane foam residues are left on the panel.
Results:
The results of the coating experiments and the testing for non-stick performance is summarized in Table 4. It can be seen that the PTFE/PFPE additives according to the invention (Sample 1) provide an acceptable coating appearance and good non-stick performance. Adding the PFPE and PTFE separately (Comparative Sample 2) does not make an acceptable coating. Adding PTFE alone (Comparative Sample 1) does not provide acceptable non-stick properties.

TABLE 4

| | Additive | Coating appearance | Non-stick properties |
|---|---|---|---|
| Sample 1 | PTFE/PFPE | Good | Good |
| Comparative Sample 1 | PTFE | Good | Poor |
| Comparative Sample 2 | PTFE + PFPE | Poor - blisters | Poor |

Example 6

Materials

Crastin® polybutylene terephthalate CR6129 NC010 from E. I. Du Pont de Nemours and Company ("PBT").
Zonyl® MP1600 Fluoroadditive (micronized PTFE powder, having an average particle size distribution of about 7 µm and a specific surface area of from about 8 to 12 m²/g, available from The Chemours Company, Wilmington, Del.). Fluoroguard® PCA from Chemours. In Sample 1 the PTFE was pretreated with PFPE essentially the same as in Examples 1 and 2. The PFPE:PTFE weight ratio was 1:4.

Compounding:

The compounding was done on a 40 mm twin screw extruder from Beiersdorf with a barrel and die temperature set at 250° C. and a screw speed of 250 rpm. Comparative Sample 1 was pure PBT. In Comparative Sample 2, in order to allow for correct dosing of the PFPE, a portion of the PBT pellets were pre-blended with PFPE and then subsequently fed in the extruder together with pure PBT and PTFE powder (Zonyl® MP1600 PTFE micropowder).

Injection Molding:

Thrust washer wear test samples with an outer diameter of 50 mm and an inner diameter of 40 mm were molded on a Netstal 1 Synergy 1750H-460 injection molding machine. The melt temperature was set to 253° C. and the mold hold pressure was 60 MPa.

The wear testing was performed using a thrust washer from Plint Tribology Products. The wear was tested against steel type 42CrMo4. The pressure was set to 40N, speed 500 rpm and test time 8 hours. The wear rate was characterised as the sample thickness reduction over time. A 10 minute of break-in period was allowed before registering the thickness reduction. Results are shown in Table 5.

TABLE 5

| Sample | Wear rate (μm/hour) |
| --- | --- |
| Sample 1 (PBT + 1.5 wt % PFPE-PTFE) | 8.7 |
| Comparative Sample 1 | 17.5 |
| Comparative Sample 2 (PBT + 0.3 wt % PFPE + 1.2 wt % PTFE) | 11.6 |

Results

Sample 1 and Comparative Sample 2 performed better than Comparative Sample 1. The wear rate was lower for Sample 1 versus Comparative Sample 2. This shows that PTFE/PFPE particles according to the invention are more efficient than adding PFPE and PTFE separately during the compounding.

What is claimed is:

1. Particles comprising polytetrafluorethylene (PTFE) and perfluoropolyether (PFPE), wherein said PTFE is micronized PTFE having a molecular weight below about 1,000,000, wherein the particles comprise from about 1 to 40 weight percent of the PFPE and from about 60 to 99 weight percent of the PTFE, and wherein the PFPE is absorbed into the PTFE such that the particles are in the form of a free-flowing powder.

2. The particles of claim 1, wherein the particles comprise from about 10 to about 30 weight percent PFPE and from about 70 to about 90 weight percent PTFE.

3. The particles of claim 1, wherein the particles consist essentially of PTFE and PFPE.

4. The particles of claim 1, wherein the PTFE of the particles comprises a comonomer.

5. A polymer compound containing the particles of claim 1.

6. The polymer compound of claim 5, comprising from about 0.1 to about 20 weight percent of the particles.

7. A coating composition comprising the particles of claim 1.

8. The coating composition of claim 7, comprising from about 0.1 to about 20 weight percent of the particles.

* * * * *